Oct. 17, 1944.  H. N. SHAW  2,360,727

FRY KETTLE

Filed Dec. 29, 1943  2 Sheets-Sheet 1

INVENTOR.
Harold N. Shaw
BY
Morsell & Morsell
ATTORNEYS

Oct. 17, 1944. H. N. SHAW 2,360,727
FRY KETTLE
Filed Dec. 29, 1943 2 Sheets-Sheet 2
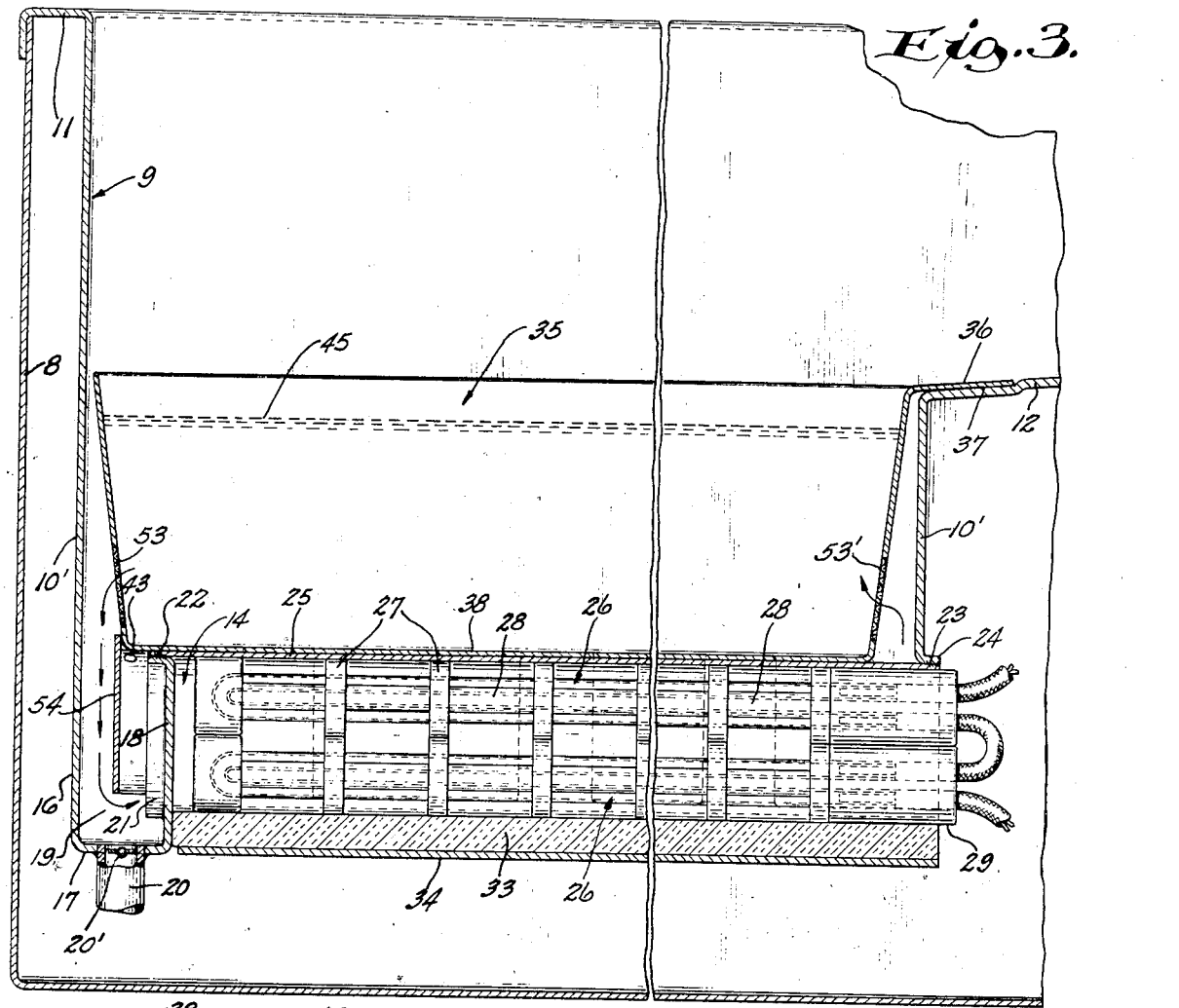
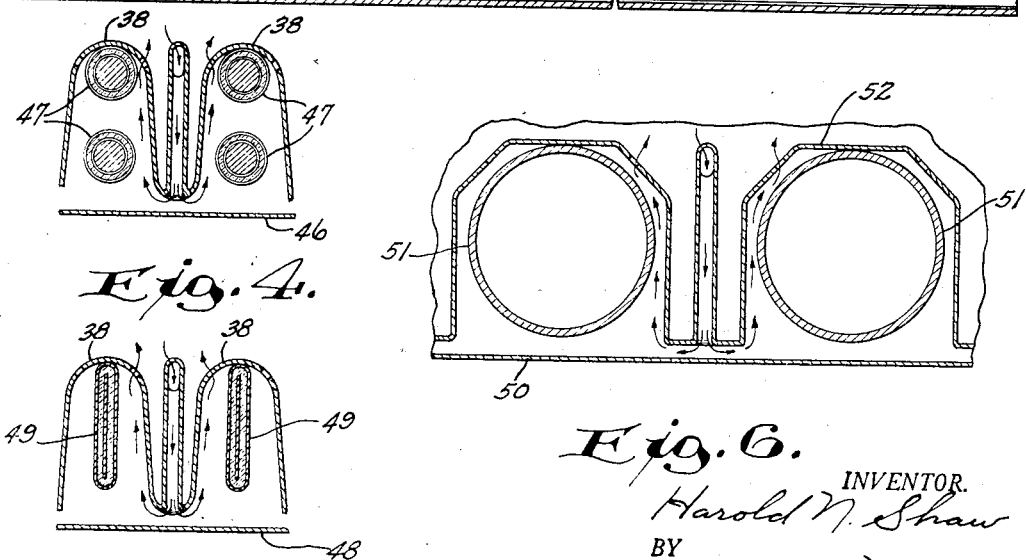
INVENTOR.
Harold N. Shaw
BY
Morsell & Morsell
ATTORNEYS.

Patented Oct. 17, 1944

2,360,727

UNITED STATES PATENT OFFICE 2,360,727

FRY KETTLE

Harold N. Shaw, Erie, Pa.

Application December 29, 1943, Serial No. 516,047

16 Claims. (Cl. 99—408)

This invention relates to improvements in fry kettles and more particularly to kettles used for deep fat frying of foods such as fish, croquettes, potatoes or the like.

Deep fat frying is commonly carried out in an ordinary flat bottom kettle over a gas flame or over a hotplate, the latter being heated by coal, oil or electricity. With this method, the fat temperature is controlled by adjusting the gas flame or by moving the kettle from hotter to cooler parts of the hotplate. One of the principal difficulties in connection with deep fat frying is that the fat must be poured through a strainer at frequent intervals to prevent charred crumbs from being deposited upon the food.

In those types of automatic, gas or electric fry kettles now generally used and having a thermostatic temperature control, the heat is applied in the interior of tubes or flat strips which extend across the kettle above the bottom thereof. These kettles are so constructed that the crumbs settle in a crumb well located below the heated tubes. This crumb well provides a space for the crumbs to accumulate without being disturbed by the circulation of the fat and without interfering with the circulation of the fat around the tubes.

Heretofore in order to eliminate frequent draining operations, it has been necessary to provide a relatively large and deep crumb well, because draining must be performed as soon as the crumb level reaches the horizontal plane of the bottom of the tubes. In most commercial kettles of this type the volume of fat required to fill the crumb well and cover the heating tubes is as great as the useful fat above the tubes. Furthermore there is a tendency for the fat to carbonize on the heating tubes if the fat is drained while the kettle is hot. In addition, the location of these crumb wells below the tubes renders cleaning difficult.

In order to provide sufficient heat to maintain a desired fat temperature when the food is being cooked continuously and at the same time to prevent overheating of the heating surface, it is necessary that the surface area of the tubes be considerably greater than the area of the bottom of the kettle. This is due to the fact that fat does not absorb heat from a heating surface as effectively as water.

In an attempt to collect crumbs by natural or forced circulation, fry kettles have been provided with horizontal screens. The latter, however, soon clog with the very fine crumbs that are always present and therefore have not proven practical. This objection is particularly noticeable in the frying of food, such as fish, which has been dipped in bread crumbs.

The principal objection, therefore, to present fry kettles is the large quantity of fat required. This becomes a major item in the cost of the food being prepared and often the cost of the fat is greater than the cost of the fuel used. For this reason automatic fry kettles are not manufactured for domestic use.

It is a principal object of the present invention to provide a high-powered fry kettle which requires the use of little more fat than that which is necessary to cover the food being cooked, the kettle nevertheless being so constructed as to provide novel means for collecting the crumbs, said means permitting quick removal of the accumulated crumbs without necessitating the emptying of the kettle.

It is a further object of the invention to provide a fry kettle wherein there is a large heating surface which projects upwardly from the bottom and wherein there is quickly responsive means for controlling the temperature of the fat which circulates over said surface.

A further object of the invention is to provide a fry kettle in which all parts of the heating surface are readily accessible for cleaning.

A more particular object of the invention is to provide a fry kettle having a crumb retainer which is so constructed and arranged as to permit free circulation of the hot fat over the heating surface and around the food but which nevertheless prevents the crumbs from settling upon said surface.

With the above and other objects in view the invention consists of the improved fry kettle and all its parts and combinations as set forth in the claims and all equivalents thereof.

In the accompanying drawings illustrating several preferred embodiments of the invention in which the same reference numerals designate the same parts in all of the views:

Fig. 3 is a fragmentary vertical sectional view taken approximately on the line 3—3 of Fig. 1, part being broken away;

Fig. 4 is a fragmentary vertical sectional view at the bottom of the kettle showing a modification wherein a different type of heating element than that of Fig. 1 is employed;

Fig. 5 is a view similar to Fig. 4 illustrating the use of still another type of heating element; and Fig. 6 is a view similar to Figs. 4 and 5 on a somewhat larger scale illustrating an arrangement which is employed in connection with gas heating tubes.

Figure 1:
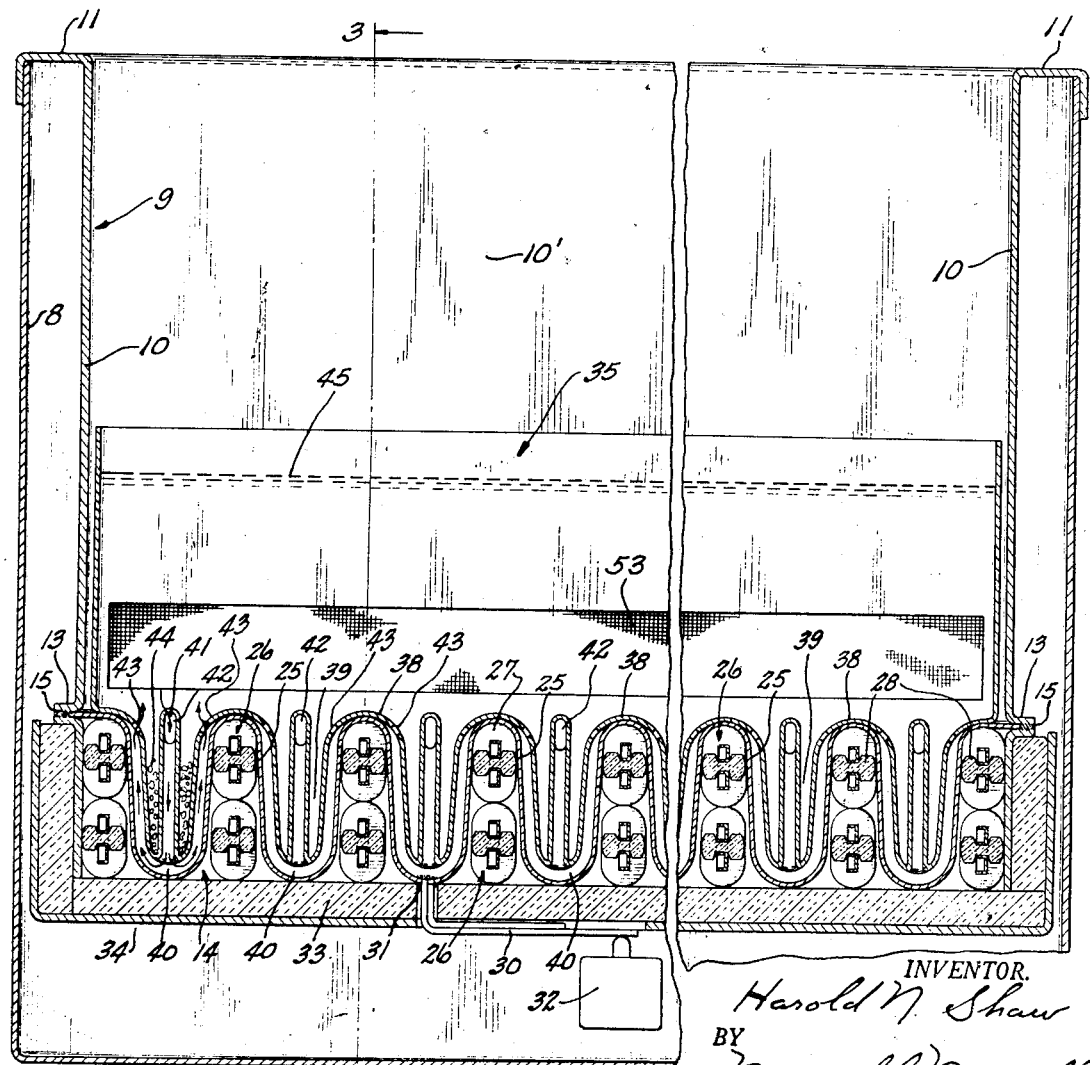
Fig. 1 is a vertical sectional view through the improved kettle taken at right angles to the direction of extent of the heating projections, part being broken away.

Referring more particularly to the drawings the fry kettle preferably includes an outer casing 8 in the form of an open top container. The kettle proper, designated generally by the numeral 9 includes side walls 10 and end walls 10' having an upper rim 11. The upper rim is preferably U-shaped in cross-section as illustrated in Fig. 1 to fit over the upper edge of the outer casing 8 and prevent fat from entering the outer case. One of the end walls 10' of the kettle terminates short of the other walls in height and is bent angularly as at 12 (see Figs. 2 and 3) to form the usual foaming ledge.

Near the bottle of the kettle the side walls 10 terminate and are flanged outwardly as at 13. This facilitates the welding of a corrugated bottom member 14 to the flanges 13 as at 15 (Fig. 1). One of the end wall portions 10' of the kettle extends downwardly below the corrugated bottom as at 16 (Fig. 3), then extends horizontally as at 17, and then upwardly as at 18 (see Fig. 3). Thus a drain channel 19 is formed in the kettle bottom through which fat may be drained when desired through a suitable outlet pipe 20. This outlet pipe should have a suitable closure valve 20' associated therewith. The wall portion 18 of the drain channel is suitably recessed at spaced intervals and each recess is bounded by a flange 21 (Fig. 3) to support the end portions of the corrugated bottom member 14. The corrugated bottom member 14 is welded to the flanges 21 as at 22. The bottom member 14 is relatively thin so as to store as little heat as possible. It is also preferably formed of stainless steel to prevent corrosion. Referring again to Fig. 3 the opposite ends of the corrugated bottom member are open and said ends are welded as at 23 to a flange 24 on the other end wall 10'.

Within each of the housing portions 25 formed by the corrugated bottom member 14 are electric heating elements 26. Preferably there are two elements of the type shown in my issued Patent No. 2,265,549. These elements are light in weight and flexible and are so supported by the spaced insulators 27 (see Fig. 3) that the elements may be readily inserted in the housings 25 during assembly. The insulators 27 together with the separating insulators 28 are part of the original assembly of the heating elements. One end of each of the housing portions 25 is closed by the solid portions of the wall 18 as shown in Fig. 3. The other end of each of the element housings is open so that the elements may project therefrom as at 29 in Fig. 3.

The elements are connected in series with one another and may be controlled by a thermostatic member 30 (Fig. 1) which is connected to the corrugated bottom as at 31 (Fig. 1). The thermostatic member 30 may operate an automatic switch 32 which serves to disconnect the current from the heating elements when the temperature of the fat exceeds a predetermined figure.

The elements are supported at the bottom by an asbestos pad 33 held in position by a suitable retainer plate 34.

Referring to the right-hand side of Fig. 3 the flange portion 24 of the kettle side wall extends downwardly between the element housing portions 25 to close the spaces between the adjacent housing portions 25 at this end of the kettle. It is to be noted that the corrugated bottom is not symmetrical, that is the width of the space between the element enclosing projections 25 is greater than the width of the projections themselves.

The crumb retainer designated generally by the numeral 35 is in the form of an open top receptacle. One end of the retainer has an angularly bent flange 36 (see Fig. 3) which rests in a depression 37 of the foaming ledge. Thus any crumbs which may wash off of the ledge will travel into the retainer and not into the space between the retainer and the kettle walls.

The bottom of the crumb retainer 35 is corrugated in a manner somewhat similar to the kettle bottom. This corrugated bottom of the crumb retainer comprises elongated ridges 38 separated by depressions or crumb wells 39. The depressions 39 of the retainer bottom are of less depth than the corresponding depressions of the container bottom as shown in Fig. 1. Thus when the retainer bottom is resting upon the projections 25 of the kettle bottom, passageways 40 for the circulation of fat are formed between the two bottom members. By having the recesses in the kettle bottom of greater width than the intervening kettle bottom projections 25 there is ample room for the fat to circulate in vertical directions alongside of the heating element housings 25 as indicated by the arrows in Fig. 1 or to circulate in the manner indicated by arrows in Fig. 3, or to circulate in both ways.

Figure 2:
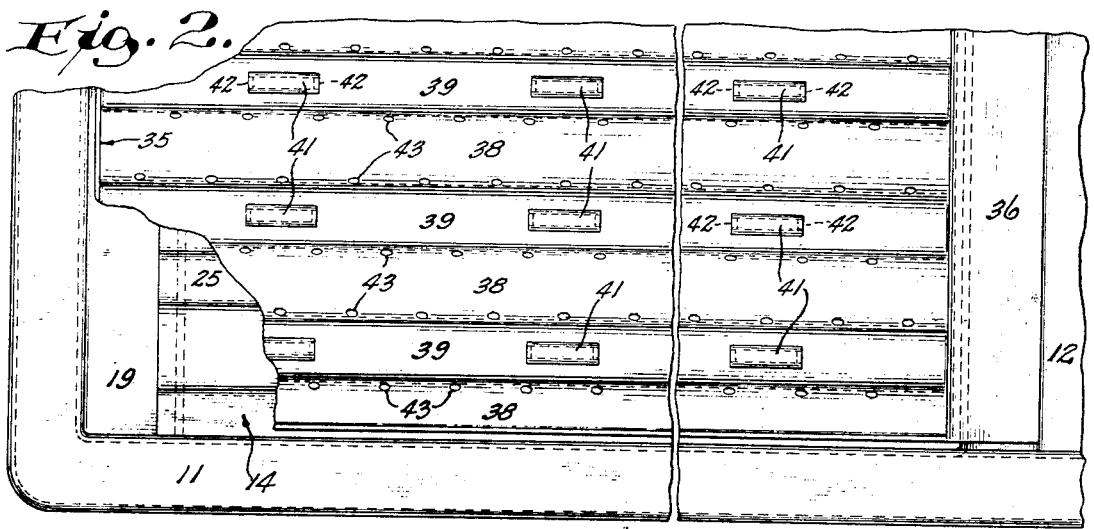
Fig. 2 is a fragmentary top view of the improved kettle looking down on the view of Fig. 3.

At spaced intervals in the length of the crumb wells 39 and projecting upwardly from the bottom thereof are circulation tubes 41 (see Figs. 1 and 2). These tubes are closed at the top and are provided with side openings 42 which are directly below the top. The bottom of each of the tubes communicates with the passageways 40 when the crumb retainer is in the position of Fig. 1. Each of the ridges 38 is formed near the top with circulation holes 43. The holes 43 extend at spaced intervals through the length of the ridges 38 as shown in Fig. 2. The total area of the openings provided by the holes 42 in the circulation tubes should be substantially equal to the total area of the openings provided by the holes 43. When the crumb retainer is filled with fat and the latter is heated, the cooler fat enters the openings 42 of the circulation tubes and travels downwardly through said tubes as indicated by the arrows in Fig. 1. The fat then travels in both directions through the passageways 40 and is heated as it passes upwardly along the sides of the element enclosing projections 25. The heated fat then passes out of the openings 43 back into the crumb retainer 35. By having the entrance openings 42 near the top of the circulation tubes and in the sides or ends thereof, crumbs cannot settle over the openings 42 to close the latter. Instead, these crumbs 44 will settle into the recesses 39 as illustrated in Fig. 1. The crumbs may be permitted to accumulate until the level thereof reaches the level of the openings 42. The holes 43 in the ridges 38 are provided on the slopes of the corrugations so as to minimize the possibility of crumbs settling over these holes. The holes 43 need not be over $\frac{1}{16}$ of an inch in diameter, as hot fat flows very freely through small openings. There should, however, be enough holes and enough tubes to insure free circulation of fat all along the corrugations.

In use of the improved fry kettle the usual basket holding the food may be inserted within the crumb retainer 35 and may rest on top of the corrugations 38. The food basket will therefore serve to brush off any crumbs which have settled on top of the corrugations 38. The crumb retainer should be filled with fat to approximately the level indicated by the line 45. When the electricity is turned on, or other heating means rendered effective, the fat circulates rapidly through the circulation tubes and passageways 40 as heretofore explained. The fat is heated by contact with the walls of the projections 25. Any small crumbs which may pass into the holes 42 will have little tendency to settle in the passageways 40 because of the rapid circulation. Furthermore, when the power is turned off there is such a small amount of fat accommodated in the passageways 40 that there are relatively few crumbs to settle. When the heat is turned on the rapid circulation in the passageways tends to pick up any crumbs that do settle and thus any possibility of circulation being restricted is prevented.

As the frying continues the crumbs from the food will settle evenly in all of the crumb wells 39 without in any way interfering with the circulation of the fat. The light weight of the heating elements shown in Fig. 1 and the thin corrugated bottom 14 permit the use of relatively shallow fat with close temperature control. This is because the heat stored in the element and in the corrugated bottom of the kettle, when the electricity is cut off, is not enough to heat the fat more than a few degrees. Thus the thermostat 30 will be effective to provide an accurate control of the temperature.

When the food has been completely fried then the basket containing the latter may be lifted and placed on the foaming shelf 12. Any grease will then quickly drain back into the crumb retainer 35.

When the crumb wells 39 of the crumb retainer have been filled with the crumbs to the level of the holes 42, then these holes will be blocked and circulation will be restricted. However, until all of the holes 42 are blocked the fat in the passageways 40 can circulate horizontally to any open holes 43. When the circulation is completely blocked then the thermostat 30 will automatically shut off the electricity because a blocked circulation will quickly bring the fat in the passageways 40 above the critical temperature for the thermostat. The shutting off of the electricity will, of course, cause the fat in the crumb retainer 35 to cool off and the cook will soon realize that the retainer must be cleaned.

To clean the retainer it is merely necessary to raise it out of the kettle 10 and permit the fat to drain out of the holes 43 and 42 into the kettle. To facilitate such drainage, screens 53 and 53' may be provided in the ends of the crumb retainer. While draining, the crumb retainer may be placed on the foaming ledge 12 and in a busy kitchen an extra retainer may be used for frying while the other one is being cleaned. Due to the high sides of the crumb retainer, the possibility of the crumbs being washed over the edges of the retainer when the latter is being lifted out of the fat is eliminated.

Some crumbs will, of course, collect on the bottom of the kettle 10. These, however, may be easily stirred up before the retainer is lowered into position and most of these crumbs will flow up through the circulation holes together with the hot fat into the retainer. Whenever the fat is changed the bottom of the kettle should be cleaned as well as the under side of the crumb retainer. This will insure free circulation in the passageways 40.

The drain channel 19 may either be fitted with a drainpipe 20 or may serve merely as a passageway for draining each of the grooves in the bottom of the kettle when the kettle is being emptied. This channel 19 facilitates cleaning and also permits circulation of fat from the end of one groove into the end of another during use of the fry kettle.

The ends of the corrugations in the crumb retainer over the drain channel are blocked by the plate 54 which prevents heated fat from entering the crumb retainer through the screen 53 on this end, but allows cool fat to flow through the latter screen down into the drain channel and into the passages 40 as shown by the arrows in Fig. 3. Heated fat may, however, flow into the crumb retainer on the other end through screen 53'. There is little tendency for crumbs to clog these vertical screens.

In the modification of Fig. 4 the bottom of the kettle is flat as at 46 rather than corrugated. Enclosed rod type electric heating elements 47 are suitable supported at their ends and take the place of the corrugated bottom. The uppermost of each of the rods 47 supports the ridges 38 of the crumb retainer bottom. This crumb retainer as used in the modification of Fig. 4 is constructed the same as the crumb retainer of Fig. 1.

A somewhat similar arrangement is illustrated in Fig. 5 wherein the kettle has a flat bottom 48 instead of a corrugated bottom. Enclosed strip type of heating elements 49 may be suitably supported to extend along the bottom of the kettle and serve as supports for the ridges 38 of the crumb retainer bottom.

In Fig. 6 there is a flat bottom 50 for the kettle instead of a corrugated bottom. Heating tubes 51 extend at spaced intervals along the bottom and support the crumb retainer 52. This crumb retainer is of somewhat modified shape but is otherwise the same as the crumb retainer of Fig. 1. The tubes 51 may enclose electric heating elements or may be a means for confining heat provided by a gas or oil burner.

It is apparent from the above that the crumb wells 39 are of very restricted depth and do not have to project a substantial distance below the heating elements. It is also apparent that little additional fat, over that needed for the actual cooking operation, is necessary because of the crumb wells; furthermore, the arrangement is such that the crumb retainer holds the accumulated crumbs out of contact with the heating surfaces. At the same time the novel circulation permits the moving fat to come in direct contact with the heating surfaces. The construction is such as to permit quick removal of the crumbs and quick cleaning of the component parts of the fry kettle when this is required.

Circulation of the fat between the heating surfaces and the food may be either through the tubes 41 and holes 43, or around the ends by way of the screens 53 and 53', or both, depending upon the particular design of the fry kettle. For example, in a narrow kettle the circulation tubes 41 and holes 43 may be omitted and the circulation through the screens 53 and 53' will result in satisfactory performance.

Various changes and modifications may be made without departing from the spirit of the invention and all of such changes are contemplated as may come within the scope of the claims.

What I claim is:

1. A fry kettle comprising a container having a bottom, means forming spaced elongated heating surfaces positioned over said bottom, a crumb retainer receptacle having a corrugated bottom to provide alternating ridges and crumb well recesses and supported in said container with the recesses of the crumb retainer received in the elongated spaces between said elongated heating surface forming means, wall portions of said crumb well recesses being spaced from portions of the heating surface forming means to provide fat passageways, said crumb retainer having openings through which fat may circulate to and from said passageways, said openings being so located as not to be clogged by crumbs accumulating in the crumb well recesses.

2. A fry kettle comprising a container having a bottom, means forming spaced elongated heating surfaces positioned over said bottom, a crumb retainer receptacle having a corrugated bottom to provide alternating ridges and crumb well recesses and supported in said container with the recesses of the crumb retainer received in the elongated spaces between said elongated heating surface forming means, wall portions of said crumb well recesses being spaced from portions of the heating surface forming means to provide fat passageways parts of which are in an upright plane, said crumb retainer having openings through which fat may circulate to and from said passageways, said openings being so located as not to be clogged by crumbs accumulating in the crumb well recesses.

3. A fry kettle comprising a container having a bottom, means forming spaced elongated heating surfaces positioned over said bottom, a crumb retainer receptacle having a corrugated bottom to provide alternating ridges and crumb well recesses and supported in said container with the recesses of the crumb retainer received in the elongated spaces between said elongated heating surface forming means, wall portions of said crumb well recesses being spaced from portions of the heating surface forming means to provide fat passageways parts of which are in an upright plane, said crumb retainer having fat inlet openings communicating with said passageways which are so located as not to be clogged by crumbs accumulating in the crumb well recesses, and said crumb retainer having fat outlet openings positioned to cause circulation of the fat upwardly in the upright portions of said passageways in close contact with the heating surfaces.

4. A fry kettle comprising a container having a bottom, means forming spaced elongated heating surfaces positioned over said bottom, a crumb retainer receptacle having a corrugated bottom to provide alternating ridges and crumb well recesses and supported in said container with the recesses of the crumb retainer received in the elongated spaces between said elongated heating surface forming means, wall portions of said crumb well recesses being spaced from portions of the heating surface forming means to provide fat passageways, circulation tubes projecting upwardly from said crumb well recesses and communicating with said fat passageways, said crumb retainer having openings including openings in upper portions of said circulation tubes through which fat may circulate to and from said passageways.

5. A fry kettle comprising a container having a bottom, means forming spaced elongated heating surfaces positioned over said bottom, a crumb retainer receptacle having a corrugated bottom to provide alternating ridges and crumb well recesses and supported in said container with the recesses of the crumb retainer received in the elongated spaces between said elongated heating surface forming means, wall portions of said crumb well recesses being spaced from portions of the heating surface forming means to provide fat passageways, circulation tubes projecting upwardly from said crumb well recesses and communicating with said fat passageways, said crumb retainer having openings including openings in upper side portions of said circulation tubes through which fat may circulate to and from said passageways.

6. A fry kettle comprising a container having a bottom, means forming spaced elongated heating surfaces positioned over said bottom, a crumb retainer receptacle having a corrugated bottom to provide alternating ridges and crumb well recesses and supported in said container with the recesses of the crumb retainer received in the elongated spaces between said elongated heating surface forming means, wall portions of said crumb well recesses being spaced from portions of the heating surface forming means to provide fat passageways, a plurality of relatively flat circulation tubes projecting upwardly from each of said crumb well receptacles and communicating with said fat passageways, said crumb retainer having openings including openings in upper portions of said circulation tubes through which fat may circulate to and from said passageways.

7. A fry kettle comprising a container having a corrugated bottom to form alternating projections and recesses, heating means housed in said projections, a crumb retainer receptacle having a corrugated bottom to provide alternating ridges and crumb well recesses and supported in said container with the recesses of the crumb retainer received in the recesses of the container bottom, wall portions of the interfitting recesses being spaced apart to provide fat passageways, said crumb retainer having openings through which fat may circulate to and from said passageways, said openings being so located as not to be clogged by crumbs accumulating in the crumb well recesses.

8. A fry kettle comprising a container having a corrugated bottom to form alternating projections and recesses, heating means housed in said projections, a crumb retainer receptacle having a corrugated bottom to provide alternating ridges and crumb well recesses and supported in said container with the recesses of the crumb retainer received in the recesses of the container bottom, wall portions of the interfitting recesses being spaced apart to provide fat passageways, circulation tubes projecting upwardly from said crumb well recesses and communicating with said fat passageways, said crumb retainer having openings including openings in upper portions of said circulation tubes through which fat may circulate to and from said passageways.

9. A fry kettle comprising a container having a corrugated bottom to form alternating projections and recesses, heating means housed in said projections, a crumb retainer receptacle having a corrugated bottom to provide alternating ridges and crumb well recesses and supported in said container with the recesses of the crumb retainer received in the recesses of the container bottom, wall portions of the interfitting recesses being spaced apart to provide fat passageways, circulation tubes projecting upwardly from said crumb well recesses and communicating with said fat passageways, said crumb retainer having openings including openings in upper side portions of said circulation tubes through which fat may circulate to and from said passageways.

10. A fry kettle comprising a container having a corrugated bottom to form alternating projections and recesses, heating means housed in said projections, a crumb retainer receptacle having a corrugated bottom to provide alternating ridges and crumb well recesses and supported in said container with the recesses of the crumb retainer received in the recesses of the container bottom, wall portions of the interfitting recesses being spaced apart to provide fat passageways, a plurality of relatively flat circulation tubes projecting upwardly from each of said crumb well recesses and communicating with said fat passageways, said crumb retainer having openings including openings in upper portions of said circulation tubes through which fat may circulate to and from said passageways.

11. A fry kettle comprising a container having a corrugated bottom to form alternating projections and recesses, heating means housed in said projections, a crumb retainer receptacle having a corrugated bottom to provide alternating ridges and crumb well recesses and supported in said container with the recesses of the crumb retainer received in the recesses of the container bottom, wall portions of the interfitting recesses being spaced apart to provide fat passageways, circulation tubes projecting upwardly from said crumb well recesses and communicating with said fat passageways, said crumb retainer having openings in upper portions of the ridges and in upper portions of said circulation tubes through which fat may circulate to and from said passageways.

12. A fry kettle comprising a container having a bottom, means forming spaced elongated heating surfaces positioned over said bottom, a crumb retainer receptacle having a corrugated bottom to provide alternating ridges and crumb well recesses and supported in said container with the recesses of the crumb retainer received in the elongated spaces between said elongated heating surface forming means, wall portions of said crumb well recesses being spaced from positions of the heating surface forming means to provide fat passageways, circulation tubes projecting upwardly from said crumb well recesses and communicating with said fat passageways, said crumb retainer having openings in upper portions of the ridges and in upper portions of said circulation tubes through which fat may circulate to and from said passageways.

13. A fry kettle comprising a container having a bottom, means forming spaced elongated heating surfaces positioned over said bottom, a crumb retainer receptacle having a corrugated bottom to provide alternating ridges and crumb well recesses and supported in said container with the recesses of the crumb retainer received in the elongated spaces between said elongated heating surface forming means, wall portions of said crumb well recesses being spaced from portions of the heating surface forming means to provide fat passageways, said crumb retainer having openings through which fat may circulate to and from said passageways, said openings being so located as not to be clogged by crumbs accumulating in the crumb well recesses, and a drain channel at one end of the container extending transversely of the spaces between said elongated heating surface forming means and in communication with the ends of said spaces.

14. A fry kettle comprising a container having a corrugated bottom to form alternating projections and recesses, heating means housed in said projections, a drain channel at one end of the container extending transversely of the corrugations and in communication with the ends of the recesses in said corrugated bottom, a crumb retainer receptacle having a corrugated bottom to provide alternating ridges and crumb well recesses and supported in said container with the recesses of the crumb retainer received in the recesses of the container bottom, wall portions of the interfitting recesses being spaced apart to form fat passageways, said crumb retainer having openings through which fat may circulate to and from said passageways, said openings being so located as not to be clogged by crumbs accumulating in the crumb well recesses.

15. A fry kettle comprising a container having a bottom, spaced elongated electric heating elements positioned over said bottom, a crumb retainer receptacle having a corrugated bottom to provide alternating ridges and crumb well recesses supported in said container with the ridges embracing the elongated heating elements and with the recesses of the crumb retainer received in the elongated spaces between said heating elements, wall portions of said crumb well recesses being spaced from portions of the heating elements to provide fat passageways, said crumb retainer having openings through which fat may circulate to and from said passageways, said openings being so located as not to be clogged by crumbs accumulating in the crumb well recesses.

16. A fry kettle comprising a container having a bottom, spaced elongated heating tubes positioned over said bottom, a crumb retainer receptacle having a corrugated bottom to provide alternating ridges and crumb well recesses supported in said container with the ridges embracing the elongated heating tubes and with the recesses of the crumb retainer received in the elongated spaces between said heating tubes, wall portions of said crumb well recesses being spaced from portions of the heating tubes to provide fat passageways, said crumb retainer having openings through which fat may circulate to and from said passageways, said openings being so located as not to be clogged by crumbs accumulating in the crumb well recesses.

HAROLD N. SHAW.